(12) United States Patent
Chung et al.

(10) Patent No.: US 8,327,325 B2
(45) Date of Patent: Dec. 4, 2012

(54) PROGRAMMABLE FRAMEWORK FOR AUTOMATIC TUNING OF SOFTWARE APPLICATIONS

(75) Inventors: I-Hsin Chung, Yorktown Heights, NY (US); Guojing Cong, Ossining, NY (US); David J. Klepacki, New Paltz, NY (US); Simone Sbaraglia, Cagliari (IT); Seetharami R. Seelam, Yorktown Heights, NY (US); Hui-Fang Wen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 12/353,433

(22) Filed: Jan. 14, 2009

(65) Prior Publication Data

US 2010/0180255 A1     Jul. 15, 2010

(51) Int. Cl.
*G06F 9/45*     (2006.01)

(52) U.S. Cl. ........ 717/110; 717/127; 717/151; 717/154; 717/157; 717/158

(58) Field of Classification Search ........................ None
See application file for complete search history.

(56) References Cited

U.S. PATENT DOCUMENTS

| | | | |
|---|---|---|---|
| 5,819,082 A * | 10/1998 | Marion | 1/1 |
| 6,311,324 B1 | 10/2001 | Smith et al. | |
| 7,120,621 B2 | 10/2006 | Bigus et al. | |
| 7,328,433 B2 * | 2/2008 | Tian et al. | 717/149 |
| 7,406,686 B2 * | 7/2008 | Liu et al. | 717/151 |
| 7,757,216 B2 * | 7/2010 | Maron | 717/127 |
| 7,827,535 B2 * | 11/2010 | Maron | 717/127 |
| 8,146,070 B2 * | 3/2012 | Archambault et al. | 717/157 |
| 2006/0101440 A1 * | 5/2006 | Stay et al. | 717/151 |
| 2007/0061784 A1 | 3/2007 | Prakash et al. | |
| 2007/0226718 A1 * | 9/2007 | Watanabe | 717/151 |
| 2008/0033696 A1 * | 2/2008 | Aguaviva et al. | 702/186 |
| 2008/0127116 A1 * | 5/2008 | Kosche et al. | 717/130 |
| 2008/0168433 A1 * | 7/2008 | Arnold et al. | 717/158 |
| 2008/0201698 A1 * | 8/2008 | Perfetta et al. | 717/161 |
| 2009/0070280 A1 * | 3/2009 | Beygelzimer et al. | 706/13 |
| 2009/0106748 A1 * | 4/2009 | Chess et al. | 717/168 |
| 2009/0177642 A1 * | 7/2009 | Chung et al. | 707/5 |

(Continued)

OTHER PUBLICATIONS

Thomas E. Anderson et al., "Quartz: A Tool for Tuning Parallel Program Performance", [Online],Sep. 1989, pp. 115-125, [Retrieved from Internet on Mar. 14, 2012], <http://www.cs.washington.edu/homes/tom/pubs/quartz.pdf>.*

(Continued)

*Primary Examiner* — Thuy Dao
*Assistant Examiner* — Ziaul A Chowdhury
(74) *Attorney, Agent, or Firm* — Yee & Associates, P.C.; Anne Dougherty

(57) ABSTRACT

A target application is automatically tuned. A list of solutions for identified performance bottlenecks in a target application is retrieved from a storage device. A plurality of modules is executed to compute specific parameters for solutions contained in the list of solutions. A list of modification commands associated with specific parameters computed by the plurality of modules is generated. The list of modification commands associated with the specific parameters is appended to a command sequence list. The list of modification commands is implemented in the target application. Specific source code regions corresponding to the identified performance bottlenecks in the target application are automatically tuned using the implemented list of modification commands. Then, the tuned target application is stored in the storage device.

20 Claims, 7 Drawing Sheets

U.S. PATENT DOCUMENTS

2009/0313615 A1* 12/2009 Joshi et al. .................. 717/154
2009/0319988 A1* 12/2009 Teranishi et al. ............ 717/110
2010/0088673 A1* 4/2010 Chen et al. .................. 717/110

OTHER PUBLICATIONS

Anna Morajko, "Dynamic Tuning of Parallel/Distributed Applications", [Online], Apr. 2004, pp. 73-74, [Retrived from Internet on Mar. 14, 2012], <http://journal.info.unlp.edu.ar/journal/journal10/papers/jcst-apr04-to1.pdf>.*

Anna Morajko et al., "MATE Monitoring Analysis and Tuning Environment", [Online], 2004, pp. 1-38 MPS], [Retrieved from Internet on Mar. 14, 2012], <http://www.paradyn.org/PCW2004/MATE_UAB.ppt>.*

Anna Morajko et al., "MATE: Dynamic Performance Tuning Environment", [Online], 2004, pp. 98-107, [Retrieved from Internet on Mar. 14, 2012], <http://www.springerlink.com/content/gg5vvuff30wjdp36/fulltext.pdf>.*

Eric Weigle et al., "A Comparison of TCP Automatic Tuning Techniques for Distributed Computing", [Online], 2002, pp. 1-8, [Retrieved from Internet on Jul. 22, 2012], <http://csag.ucsd.edu/individual/ehw/papers/HPDC-2002-DRS.pdf>.*

Goetz Graefe et al., "Tuning a Parallel Database Algorithm on a Shared-memory Multiprocessor", [Online], 1991, pp. 495-517, [Retrieved from Internet on Jul. 22, 2012], <http://citeseerx.ist.psu.edu/viewdoc/download?doi=10.1.1.14.4995&rep=rep1&type=pdf.*

Brian L. Tierney, "TCP Tuning Guide for Distributed Application on Wide Area Networks", [Online], 2001, pp. 1-8, [Retrieved from Internet on Jul. 22, 2012], <http://www-didc.lbl.gov/GGF-PERF/GMA-WG/papers/GWD-GP-5-1.pdf>.*

Md. Zillur Rahman, "Open Source Database Management Systems for Low Cost Solutions", [Online], 2006, pp. 1-130, [Retrieved from Internet on Jul. 22, 2012], <http://citeseerx.ist.psu.edu/viewdoc/download?doi=10.1.1.95.1000&rep=rep1&type=pdf>.*

* cited by examiner

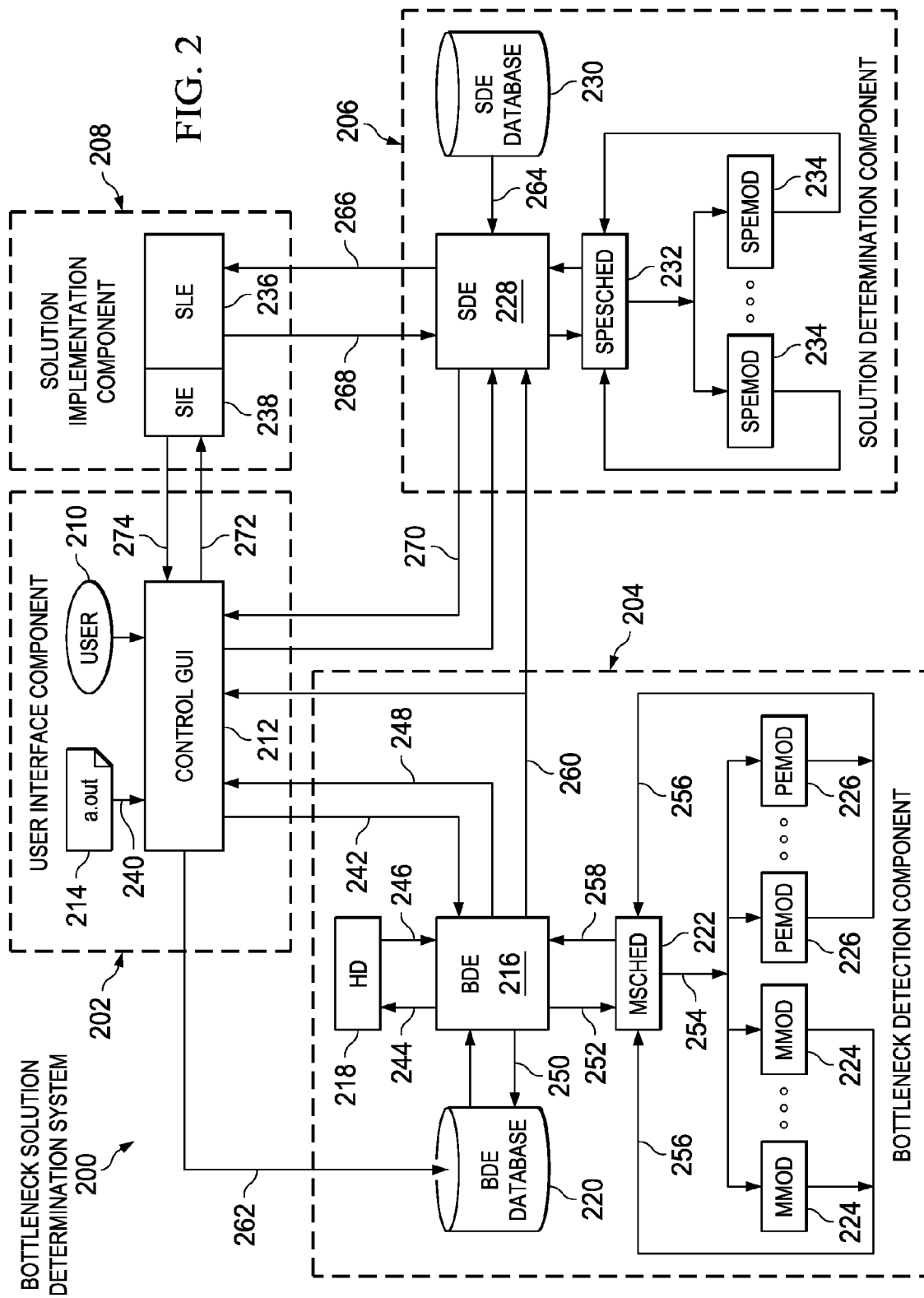

300

SDE DATABASE

SOLUTION TABLE 302

| BOTTLENECK NAME 306 | SOLUTION LIST 308 | CRITERIA 310 |
|---|---|---|
| BAD DATA CACHE BEHAVIOR FOR A LOOP | UNROLL-AND-JAM; LOOP-BLOCKING; MATRIX-TRANSPOSE | SELECT THE SOLUTION WITH THE BEST CACHE PERFORMANCE IMPROVEMENT WHEN IN CONFLICT |
| EXCESSIVE TIME ON MPI CALLS | IMPROVE LOAD BALANCING; COMMUNICATION AND COMPUTATION OVERLAP | SELECT THE SOLUTION WITH MINIMUM SOURCE CODE IMPACT WHEN IN CONFLICT |
| *ALL | QUERY COMPILER FOR REPORTS AND HELPFUL SUGGESTIONS | NONE |

MODULE TABLE 304

| SOLUTION NAME 312 | SPE MODULE LOCATION 314 | MODULE EXECUTION MODE 316 |
|---|---|---|
| UNROLL | $IHPCST_BASE/Modules/Unroll | INCLUSIVE |
| COMMUNICATION AND COMPUTATION OVERLAP | $IHPCST_BASE/Modules/overlap | INCLUSIVE |
| TRANSPOSE | $IHPCST_BASE/Modules/transpose | |
| INTERCHANGE | $IHPCST_BASE/Modules/interchange | |
| GLOBAL TRANSPOSE | TRANSPOSE + LOOP INTERCHANGE MODULES | |
| ... | .... | ...... |

| SLE TABLE 402 |||
| SLE |||
| SOLUTION NAME 404 | SLE MODULE NAME 406 | SLE MODULE LOCATION 408 |
|---|---|---|
| UNROLL | UNROLL-CHECK | $IHPCST_BASE/SLE/unroll-check |
| TRANSPOSE | TRANSPOSE-CHECK | $IHPCST_BASE/SLE/unroll-check |

500

| SIE TABLE 502 |||
| SIE |||
| SOLUTION NAME 504 | SIE MODULE NAME 506 | SIE MODULE LOCATION 508 |
|---|---|---|
| UNROLL | UNROLL-IMPL | $IHPCST_BASE/SIE/unroll-impl |
| TRANSPOSE | TRANSPOSE-IMPL | $IHPCST_BASE/SIE/unroll-impl |

PROGRAMMABLE FRAMEWORK FOR AUTOMATIC TUNING OF SOFTWARE APPLICATIONS

This invention was made with United States Government support under Contract No.: HR0011-07-9-0002 awarded by Defense Advanced Research Projects Agency (DARPA). The Government has certain rights in the invention.

BACKGROUND OF THE INVENTION

1. Field of the Invention

The present invention relates generally to an improved data processing system and more specifically to a computer implemented method, system, and computer usable program code for an extensible and programmable framework for automatic performance analysis and tuning of software applications.

2. Description of the Related Art

Due to the complex nature of supercomputer architectures, tremendous effort must be expended in order to tune and optimize an algorithm or program for a target platform. Performance analysis and optimization are crucial to fully utilizing these high performance computing (HPC) systems, especially when considering that modern HPC software generally includes millions of lines of code. With the processing speed of these powerful HPC systems now measured in teraflops, which is equal to one trillion floating point operations per second, it is easy to understand that it is essential to identify any performance bottlenecks and provide performance tuning advice quickly and accurately when deploying such HPC applications. At present, the process of application performance tuning is a tedious manual labor process with an effort that increases in complexity as computer systems grow in size and ability. With future computing systems exceeding half million or more processing cores, this manual process will become unfeasible in all but the most trivial cases.

BRIEF SUMMARY OF THE INVENTION

According to one embodiment of the present invention, a target application is automatically tuned. A list of solutions for identified performance bottlenecks in a target application is retrieved from a storage device. A plurality of modules is executed to compute specific parameters for solutions contained in the list of solutions. A list of modification commands associated with specific parameters computed by the plurality of modules is generated. The list of modification commands associated with the specific parameters is appended to a command sequence list. The list of modification commands is implemented in the target application. Specific source code regions corresponding to the identified performance bottlenecks in the target application are automatically tuned using the implemented list of modification commands. Then, the tuned target application is stored in the storage device.

BRIEF DESCRIPTION OF THE SEVERAL VIEWS OF THE DRAWINGS

FIG. 2 is an exemplary illustration of a bottleneck solution determination system in accordance with an illustrative embodiment;

FIG. 3 is an exemplary illustration of data contained within a solution determination engine database in accordance with an illustrative embodiment;

DETAILED DESCRIPTION OF THE INVENTION

Figure 1:
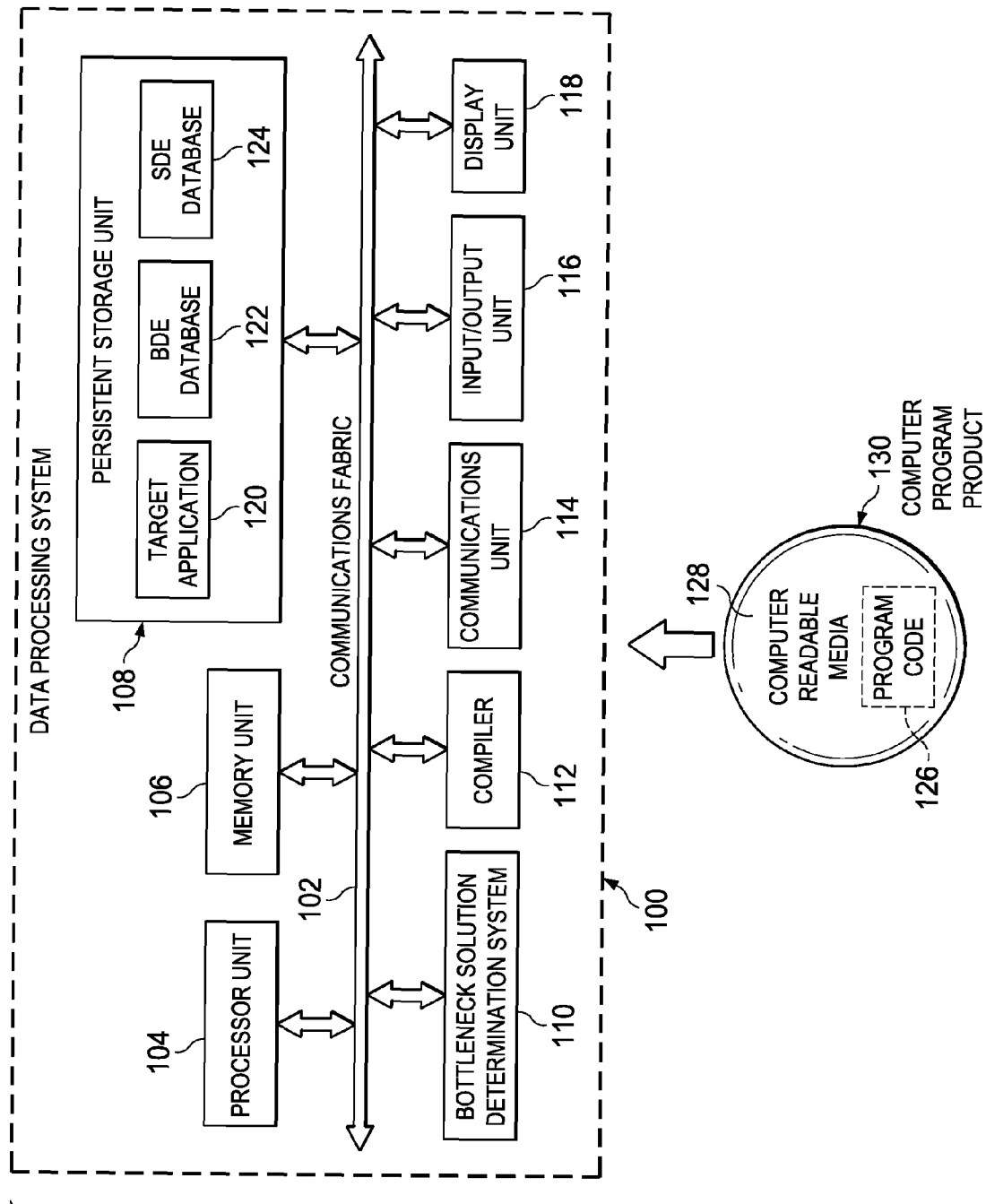
FIG. 1 is a diagram of a data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or block diagram block or blocks.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in which illustrative embodiments may be implemented. In this illustrative example, data processing system 100 includes communications fabric 102, which provides communications between processor unit 104, memory unit 106, persistent storage unit 108, bottleneck solution determination system 110, compiler 112, communications unit 114, input/output (I/O) unit 116, display unit 118.

Processor unit 104 serves to execute instructions for software that may be loaded into memory unit 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory unit 106, in these examples, may be, for example, a random access memory (RAM). Persistent storage unit 108 may take various forms depending on the particular implementation. For example, persistent storage unit 108 may contain one or more components or devices, such as a hard drive, a flash memory, a rewritable optical disk, a rewritable magnetic tape, or some combination of the above. The media used by persistent storage unit 108 also may be removable. For example, a removable hard drive may be used for persistent storage unit 108.

Persistent storage unit 108 enables the storage, modification, and retrieval of data. Persistent storage unit 108 includes target application 120, bottleneck detection engine (BDE) database 122, and solution determination engine (SDE) database 124. Target application 120 is a software application that a user selects as a target for automatic performance analysis and tuning by bottleneck solution determination system 110. Target application 120 may be any type of software application, such as, for example, a high performance computing application, running on a computer system. In addition, target application 120 may represent a plurality of software applications within persistent storage unit 108.

Bottleneck solution determination system 110 utilizes BDE database 122 to store data regarding performance bottleneck analysis of software applications, such as target application 120. In addition, bottleneck solution determination system 110 utilizes SDE database 124 to store data regarding possible solutions for identified performance bottlenecks in the target applications. Bottleneck solution determination system 110 automatically modifies or tunes the software applications by removing the identified performance bottlenecks using these stored performance bottleneck solutions. Software application tuning improves the performance of the software applications so tuned. BDE database 122 and SDE database 124 may store this data in, for example, a relational or structured format in one or more tables. However, it should be noted that BDE database 122 and SDE database 124 may also store this data in an unstructured format as well. Further, BDE database 122 and SDE database 124 may represent a plurality of databases.

Bottleneck solution determination system 110 is an information processing system configured to provide an extensible and programmable framework that provides for the definition of performance bottlenecks and their corresponding solutions in any application on any given system, the collection of performance metrics for bottleneck evaluation, the suggestion of solutions or modifications for corresponding performance bottlenecks, the legality and conflict checks for the suggested solutions, and the automatic implementation and evaluation of the suggested solutions. Extensible means that a user or developer may expand or add to the capabilities of bottleneck solution determination system 110 on an as needed basis.

Bottleneck solution determination system 110 automates both application performance analysis and application tuning from a system wide perspective, such as, for example, from the perspective of CPU, memory, communication, thread, and input/output (I/O) dimensions within the system. Bottleneck solution determination system 110 achieves this automation by integrating performance tooling technologies, along with knowledge based systems, for recognizing both performance problems and their solutions, together with compiler based analysis and transformation. An advantage of this framework is that it vastly reduces the manual labor process of application analysis and tuning. Tuning goes beyond optimization and is capable of altering both the data structures and control flow across multiple address spaces that are commonly used in high performance parallel computing, as well as, being able to identify problems with the hardware. For example, tuning may alter the layout of a parallel file system to make the application run faster, without making any changes to the application, itself.

It should be noted that bottleneck solution determination system 110 may be implemented entirely as software, entirely as hardware, or as a combination of both software and hardware. Further, a user, such as a system administrator, may enable and bottleneck solution determination system 110 independently of other data processing system 100 features and components. Furthermore, it should be noted that bottleneck solution determination system 110 may be located remotely in another data processing system, such as, a server or client device, connected to data processing system 100 via a network through communications unit 114.

Data processing system 100 and/or bottleneck solution determination system 110 use compiler 112 to translate software application source code into executable object code (also known as assembly code or machine code). This object code consists of lines of code that are machine instructions, which are understood by a processor, such as processor unit 104. In addition, compiler 112 may also perform lexical analysis, preprocessing, parsing, semantic analysis, code generation, and code optimization. Further, in response to queries, compiler 112 may provide helpful suggests or hints for software application optimization in generated reports.

Communications unit 114, in these examples, provides for communications with other data processing systems or devices. In these examples, communications unit 114 is a network interface card. Communications unit 114 may provide communications through the use of either or both physical and wireless communications links.

Input/output unit 116 allows for input and output of data with other devices that may be connected to data processing system 100. For example, input/output unit 116 may provide a connection for user input through a keyboard and mouse. Further, input/output unit 116 may send output to a printer. Display unit 118 provides a mechanism to display information to the user.

Instructions for an operating system and applications or programs, such as target application 120, are located on persistent storage unit 108. These instructions may be loaded into memory unit 106 for execution by processor unit 104. The processes of different illustrative embodiments may be performed by processor unit 104 using computer implemented instructions, which may be located in a memory, such as memory unit 106. These instructions are referred to as, program code, computer usable program code, or computer readable program code that may be read and executed by a processor in processor unit 104. The program code in the different illustrative embodiments may be embodied on different physical or tangible computer readable media, such as memory unit 106 or persistent storage unit 108.

Program code 126 is located in a functional form on computer readable media 128 and may be loaded onto or transferred to data processing system 100 for execution by processor unit 104. Program code 126 and computer readable media 128 form computer program product 130 in these examples. In one example, computer readable media 128 may be in a tangible form, such as, for example, an optical or magnetic disc that is inserted or placed into a drive or other device that is part of persistent storage unit 108 for transfer onto a storage device, such as a hard drive that is part of persistent storage unit 108. In a tangible form, computer readable media 128 also may take the form of a persistent storage, such as a hard drive or a flash memory that is connected to data processing system 100. The tangible form of computer readable media 128 is also referred to as computer recordable storage media.

Alternatively, program code 126 may be transferred to data processing system 100 from computer readable media 128 through a communications link to communications unit 114 and/or through a connection to input/output unit 116. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different illustrative embodiments may be implemented. The different illustrative embodiments may be implemented in a data processing system including components in addition to, or in place of, those illustrated for data processing system 100. Other components shown in FIG. 1 may be varied from the illustrative examples shown.

For example, a bus system may be used to implement communications fabric 102 and may comprise one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory unit 106 or a cache, such as found in an interface and memory controller hub, which may be present in communications fabric 102.

With reference now to FIG. 2, an exemplary illustration of a bottleneck solution determination system is depicted in accordance with an illustrative embodiment. Bottleneck solution determination system 200 may, for example, be bottleneck solution determination system 110 in FIG. 1 and may be implemented in a data processing system, such as data processing system 100 in FIG. 1. Bottleneck solution determination system 200 includes user interface component 202, bottleneck detection component 204, solution determination component 206, and solution implementation component 208.

Communication between components of bottleneck solution determination system 200 is indicated by arrows, which connect the different components. The direction of information flow is indicated by the direction of each arrow. In addition, associated with each arrow is a collection of information to be exchanged, which is called an interface, between the components. Each interface is labeled with a reference number for ease of identification.

User interface component 202 is the component that a user, such as, user 210, may utilize to interact with bottleneck detection component 204, solution determination component 206, and solution implementation component 208. User interface component 202 includes control graphical user interface (GUI) 212 and a.out 214. Bottleneck detection component 204 is the component that detects performance bottlenecks in a target application, such as target application 120 in FIG. 1. Bottleneck detection component 204 includes bottleneck detection engine (BDE) 216, hotspot detector (HD) 218, BDE database (DB) 220, BDE module scheduler (MSCHED) 222, metric modules (MMOD) 224, and performance estimation modules (PEMOD) 226.

Solution determination component 206 is the component that identifies one or more possible solutions to the performance bottlenecks identified by bottleneck detection component 204. Solution determination component 206 includes solution determination engine (SDE) 228, SDE DB 230, solution parameter estimation scheduler (SPESCHED) 232, and solution parameter estimation modules (SPEMODs) 234. Solution implementation component 208 is the component that implements the possible candidate solutions identified by solution determination component 206. Solution implementation component 208 includes solution legality engine (SLE) 236 and solution implementation engine (SIE) 238.

Control GUI 212 is a user interaction handler for handling any interaction with user 210. The primary role of control GUI 212 is to coordinate the operations of the framework for bottleneck solution determination system 200, request and provide information from and to user 210, and display the results to user 210 via a display unit, such as display unit 118 in FIG. 1. However, it should be noted that control GUI 212 is by no means mandatory. In other words, similar functionality may be provided by a text-only control interface as well.

Initially, control GUI 212 receives a target application in the form of a binary executable, such as a.out 214, from user 210. In addition, the source code, which is used to produce the binary executable, may also be present within the system on a storage unit, such as persistent storage unit 108 in FIG. 1. After receiving the target application via interface 240 in the form of binary executables, sources, makefiles, and configurations, control GUI 212 issues a request to BDE 216 via interface 242. Interface 242 provides the binary executables and the executables parameters and locations to BDE 216.

BDE 216 analyzes the target application by collecting performance data during execution of the target application and detecting any previously defined performance bottlenecks within the target application. Further, BDE 216 requests HD 218, via interface 244, to profile the target application, provide a summary of hotspots within the target application, and list all source code files used to produce the binary executable for the target application. A hotspot is a region of source code or address space that exceeds a predetermined time threshold to execute in a target application. HD 218 returns this requested information to BDE 216 via interface 246.

Subsequent to receiving the requested information from HD 218, BDE 216 sends this information, via interface 248, to control GUI 212 for user 210 to review. After reviewing the profile data, the summary of hotspots, and the list of all source code files used to produce the binary executable for the target application, user 210 then has the option to guide BDE 216, via control GUI 212, with regard to which source code regions and which hotspots to analyze. For example, user 210 may examine the profile data and optionally choose to narrow the analysis of the target application to only user-selected hotspots. This is opposed to the default behavior of analyzing all hotspots within the entire target application. Also, after reviewing the source code regions associated with each of the hotspots, user 210 may only select specific contiguous regions of source statements for analysis.

Also, performance bottlenecks may be classified as belonging to a particular dimension, such as, for example, a CPU bottleneck dimension, a memory bottleneck dimension, an I/O bottleneck dimension, a communication bottleneck dimension, or a thread bottleneck dimension. However, it should be noted that illustrative embodiments are not limited to the above-listed bottleneck dimensions. Illustrative embodiments may include more or fewer bottleneck dimensions as needed.

User 210 may instruct bottleneck detection component 204 to look for bottlenecks in only user-selected dimensions. However, bottleneck detection component 204 may be configured to check for bottlenecks in all dimensions by default.

Then, control GUI 212 again invokes BDE 216, via interface 242, and requests that BDE 216 perform the performance analysis on the selected regions of the source code and the selected performance bottleneck dimensions. A bottleneck may have an associated performance improvement metric. This performance improvement metric represents an expected improvement in performance when the bottleneck is removed from the target application. A performance bottleneck is removed when the target application or system is changed in such a way that the rule associated with the bottleneck evaluates to false.

A metric is a measurement of a particular characteristic of an application's performance or efficiency. Each metric has a corresponding logical module, which is responsible for computing or estimating the respective metric. The association of the module to the metric is defined within a table in BDE DB 220. A module is a program and may provide more than one metric, depending on the different parameters the module accepts.

Each module abstracts certain performance characteristics of the target application, which may be used to define potential "bottlenecks". A performance bottleneck is anything that inhibits the potential for the target application to execute faster on a given system and is correctable. Bottleneck rules are defined by means of logical expressions, which employ metrics that are combined with arithmetic and logical operators. These bottleneck rules may be evaluated to either true or false.

An example of a bottleneck rule is "#L1Misses>100". In other words, a bottleneck exists when over 100 L1 cache misses occurs in the system. This exemplary bottleneck rule involves the metric "#L1Misses".

It should be noted that a performance improvement metric must also have an associated module, such as PEMOD 226, which is responsible for computing or estimating the performance improvement metric. The association between the performance improvement metric and corresponding PEMOD 226 is recorded in BDE DB 220. All the bottleneck, module, and metric data are stored in BDE DB 220, which is represented by interface 250.

After receiving the user-specified hotspot information from control GUI 212, via interface 242, BDE 216 consults BDE DB 220, via interface 250, and extracts a list of all performance bottlenecks that correspond to one of the dimensions selected by the user. Then, BDE 216 parses the bottleneck rules associated with the selected dimension. Subsequent to parsing the rules, BDE 216 extracts a list of all metrics, along with their corresponding parameters, which are needed to evaluate the bottleneck rules. Afterward, BDE 216 issues a request to MSCHED 222, via interface 252, for MSCHED 222 to pass to BDE 216 a list of all metrics that need to be computed.

MSCHED 222 is responsible for executing MMODs 224 and PEMODs 226, which correspond to the specific metrics requested by BDE 216. In addition, MSCHED 222 is responsible for collecting and returning these requested metrics, which also include performance estimation metrics, to BDE 216. The information regarding the association between a metric and a corresponding metric module or performance estimation module is transmitted to MSCHED 222 via interface 252.

MSCHED 222 uses the association information to direct the appropriate modules to compute the requested metrics via interface 254. MMODs 224 and PEMODs 226 may individually specify a mode of execution. This specified mode of execution prescribes whether a module may run inclusively in parallel with other modules or must run exclusively by itself.

MSCHED 222 analyzes the dependencies between metrics (i.e., one metric may depend on other metrics and, therefore, one module may need to run before the others) and the specified mode of execution for each module. Then, MSCHED 222 appropriately schedules the appropriate modules to run, exploiting as much parallelism as possible, while preserving metric dependency and module mode of execution specifications.

Each directed MMOD 224 and PEMOD 226 returns its respective computed metric to MSCHED 222 via interface 256. After MSCHED 222 collects all the requested metrics, MSCHED 222 sends these requested metrics to BDE 216 via interface 258.

Subsequently, BDE 216 evaluates the bottleneck rules and composes a bottleneck description for all performance bottlenecks whose rule evaluates to true. This bottleneck description includes the name of the performance bottleneck, the region of the source code where the bottleneck was detected, and the estimated percentage of performance improvement when the performance bottleneck is removed. BDE 216 sends this bottleneck description information to control GUI 212 via interface 260 for user 210 to review.

After reviewing the bottleneck description information, user 210 then has the option to add new bottleneck definitions to BDE DB 220 and/or modify or delete previously identified and stored bottleneck definitions in BDE DB 220 via interface 262. Furthermore, user 210 may add newly created modules, such as MMODs or PEMODs, and/or modify or delete previously stored modules in BDE DB 220 via interface 262. Moreover, user 210 may query BDE DB 220 via interface 262 to retrieve and review desired data.

After placing a newly created module in BDE DB 220, user 210 should register this newly created module with BDE 216. User 210 may manually perform registration of this newly created module with BDE 216 or may perform registration by using another tool. User 210 may also register the corresponding metric(s) computed or estimated by the newly created module with BDE 216. In addition, these corresponding metrics may take optional arguments. As a result, these optional argument metrics may be registered with BDE 216 as well.

HD 218 instruments or augments the target application and potentially the target application's environment, which includes entities that interact with the target application, such as the operating system, with probe libraries for performance data collection. Afterward, HD 218 executes the target application. Then, HD 218 profiles the target application during execution to find the most time-consuming regions of source code or address space. These regions of source code that consume significant amounts of time for execution are identified as hotspots. These hotspots may be determined by, for example, the use of default execution time thresholds or by user-defined thresholds. Also, these identified hotspots may or may not suggest performance bottleneck problems. For example, some of these hotspot source code regions make full and efficient use of system resources and further tuning will not improve performance. In contrast, other hotspot source code regions are caused by inefficient use of system resources and further tuning will improve performance.

HD 218 may perform this profiling in several ways depending on how the target application is augmented and executed. The target application may be augmented at the source code level, the binary level, or at the runtime level. In addition, this profiling may also be done in several bottleneck dimensions, such as, for example, the computation or CPU dimension, the communication dimension, or the I/O dimension.

One option for detecting a computation or CPU dimension bottleneck is to use the profiling capability of a compiler, such as compiler 112 in FIG. 1, which is the gprof approach. Using this gprof approach compiler profiling option, the source code may be compiled in such a way that the necessary probes and runtime sampling libraries are inserted into the binary executable. This now augmented application may then run on the target system such that a distribution of execution time over the memory address spaces or program constructs is obtained. Depending on the threshold, which may be a preset threshold or a user-defined threshold, the source code regions that exceed the threshold time period to execute are considered hotspots. Hotspots may have different granularity, such as function level, statement level, basic block level, and instruction level.

One option for detecting a communication dimension bottleneck in message passing interface (MPI) applications is to use the PMPI profiling interface and library. MPI applications allow clusters of computers to communicate with one another. Finally, one option for detecting an I/O dimension bottleneck is to use I/O tracing.

Subsequent to detecting performance bottlenecks in the target application, depending upon the configuration of bottleneck solution determination system 200, BDE 216 may either return the performance bottleneck results to control GUI 212 to ask for further interaction from user 210 or pass the performance bottleneck results directly to SDE 228 via interface 260 for automatic tuning of the target application.

After receiving a list of identified performance bottlenecks in the target application from BDE 216 via interface 260, SDE 228 consults SDE DB 230 via interface 264 for a list of possible candidate solutions that address the identified performance bottlenecks in the target application. However, the proposed candidate solutions for the identified performance bottlenecks are generic. As a result, actual solution implementation for each specific target application requires specific parameters, such as, for example, the unroll factor for an unroll solution. To obtain the specific parameters for each of these proposed solutions, which includes, for example, the exact information needed for implementation of the solutions, the performance impact of the solutions on the target application, and the source code impact of the solutions, SDE 228 passes the list of proposed candidate solutions to SPESCHED 232 to collect the specific parameters from SPEMODs 234. Accordingly, SPESCHED 232 schedules the sequence of parameter collection by invoking the appropriate SPEMODs 234 in the proper order. Logically, one SPEMOD 234, which is responsible for computing or estimating a specific parameter, exists for each candidate solution. Dependencies among SPEMODs 234 may exist for a specific target application. Consequently, SPESCHED 232 needs to determine the order that SPEMODs 234 are invoked or executed.

Then, SDE 228 passes via interface 266 the list of proposed candidate solutions, along with the computed specific parameters for each proposed candidate solution returned by SPESCHED 232, to SLE 236 for legality checks. SLE 236 checks for legality (i.e., whether applying a proposed solution violates any predefined rules, such as, for example, data dependency among statements) and possible conflicts among solutions. Afterward, SLE 236 returns the results of the legality checks and matrices of conflicts between solutions to SDE 228 via interface 268.

SDE 228 may choose to filter out illegal solutions that violate the predefined rules and then pass the filtered legality results back to control GUI 212 via interface 270 for user 210 to select the final solutions to be implemented in the target application. After the solution lists are selected for the identified performance bottlenecks in the target application, control GUI 212 passes the list of selected solutions, along with their respective parameters, to SIE 238 via interface 272 for implementation of the selected solutions. SIE 238 coordinates the combination of solutions and returns the results, such as, for example, the modified source code regions in the target application, to control GUI 212 via 274 for user 210 review. However, it should be noted that bottleneck solution determination system 200 may be implemented to automate the whole process without control GUI 212 being involved. In one illustrative embodiment, each SPEMOD 234 may consult with SLE 236 and choose to incorporate the functionality of SLE 236 into that SPEMOD.

SDE 228 is an important driver for the flow of solution discovery in bottleneck solution determination system 200 because SDE 228 coordinates the discovering of solutions, finding specific parameters for the solutions, checking the legality of the solutions, and implementing the solutions. SDE 228 may also receive interactions from user 210 via control GUI 212 during the process. Further, SDE 228 receives performance bottleneck information from control GUI 212 or BDE 216 and consults SDE DB 230 for possible candidate solutions, which may impact or improve performance and alleviate the detected performance bottlenecks. Furthermore, SDE 228 also consults SLE 236 for the legality of solutions and conflicts among them. SDE 228 recommends candidate solutions to user 210 through control GUI 212 according to the results from SIE 238 and criteria defined in SDE DB 230. Moreover, SDE 228 may also drive automatic implementation of bottleneck solutions through SIE 238.

SDE DB 230 is an extensible database that encodes solutions to given performance bottlenecks. A solution may come in many forms. For example, a solution may be in the form of guidance to the compiler. For example, the solution guidance may be for the compiler to perform a standard compiler transformation, such as "loop unrolling" or "function inlining." Also, a solution may be a modification to the software environment of an application, such as, for example, changing the environment variable or some libraries. In addition, a solution may be a reconfiguration of hardware, such as, for example, tuning simultaneous multithreading in a processor, such as processor unit 104 in FIG. 1. Further, a solution may be suggestions or guidelines as how to modify the source code regions affected by performance bottlenecks or improve application performance. Furthermore, a solution may also be customized by an expert user to reflect tuning for applications in a certain domain, such as, for example, the domain of science.

At least two important tables, which are shown in FIG. 3, exist within SDE DB 230. One table is a solution table that describes candidate solutions for each identified performance bottleneck and the criteria for assigning priorities to those candidate solutions. Candidate solutions are of a generic nature, that is, the solutions may need to be specifically customized for each specific target application. For example, loop tiling may be a solution for bad caching behavior, but the actual tile size used is dependent on the specific target application. The other table is a module table that provides the location of SPEMODs 234 that have the functionality to compute specific parameters for a corresponding performance bottleneck solution.

SPESCHED 232 inspects each solution level by level. For all solutions, or intermediate results, inside a current level, SPESCHED 232 consults the tables in SDE DB 230 to locate the appropriate SPEMODs 234 and run those SPEMODs 234 simultaneously, if possible. SPESCHED 232 waits until all SPEMODs 234 in one level finish execution and then collects the return values from those SPEMODs 234 as the values for the corresponding parameters. When SPESCHED 232 finishes inspecting all the levels in the solutions, SPESCHED 232 exits with a solutions parameters list.

SPEMODs 234 may be categorized into one of two classes. The first class of modules includes those basic or simple modules that do not depend on other modules. These simple modules are programs that inspect the target application and provide parameters necessary for implementation of the solutions to respective performance bottlenecks. For example, in the case of loop unrolling, a specific module program analyzes the loop nests of the target source code region in the application and then selects a factor or value that yields the best performance of the unrolled loop. In order to select the right factor, the module program may need to extensively search through the vector space.

The second class of modules includes those modules that are synthesized using other modules. This synthesis provides the flexibility of combining existing modules, which may be required for more complex solutions. Combining solutions is very common, especially when each individual solution is standardized and well defined. For example, the compiler loop tiling solution is a composite of a loop strip mining solution and an interchange solution. In addition, the compiler loop tiling solution may further be combined with a loop skewing solution to handle cases that would otherwise not be amenable to loop tiling.

Also, it should be noted that user 210 may add a plurality of SPEMODs 234 to bottleneck solution determination system 200 as needed to provide extensibility to bottleneck solution determination system 200. For example, user 210 may add a new module to the plurality of SPEMODs 234 to compute specific parameters for an associated newly added generic solution definition. Alternatively, user 210 may modify a previously stored SPEMOD 234 to compute the specific parameters for the new generic solution definition. Also, user 210 may delete unneeded SPEMODs 234 as necessary. A typical simple module is often a binary executable that implements a template provided by the framework. Other implementations, such as a shell script, are possible for a simple module. The newly created modules are placed in bottleneck solution determination system 200 and user 210 registers these created modules with the system. User 210 may manually register the modules with SDE 228 or may automatically register the modules using another tool. SPEMODs 234 may take input arguments in the form of a file. Alternatively, other input methods are possible.

Similarly, the output of SPEMODs 234 may be stored in a file. The output may be passed to another module for additional processing or the output may be communicated to the framework in other forms. For composite SPEMODs 234, a language is provided to express how user 210 wants the existing SPEMODs 234 to be combined. This language may be as simple as a few operators, but may also be extended to complex scripting languages.

SLE 236 is responsible for checking the legality of proposed solutions with their respective parameters, which are provided by SDE 228, and for finding conflicts among the proposed solutions. SLE 236 provides legality checks for a set of frequently used transformations, which includes standard compiler transformations. Usually, modifications to the source code involve data dependency checks that may be handled by mature dependency test techniques, such as, for example, the Omega test. Often, changes to the environment or configuration do not impact the correctness of the target application, but the performance. For example, changing the MPI eager limit does not impact the semantics of the target application, but only runtime performance behavior. If a legality check module does not already exist in SLE 236 for a certain solution, the legality check database in SLE 236 may be expanded to include an external legality check module.

Conflicts among solutions may occur when proposed solutions involve modifications to the same source code region, data structure, program statement, or other control. When multiple candidate solutions exist, some solutions may not be applied simultaneously. As a result, SLE 236 needs to check for conflicts among the candidate solutions so that afterward, user 210 may be able to select those candidate solutions that go together. Conflict checks may occur at different granularities. For example, SLE 236 may take a very conservative approach and allow only one change per function. Alternatively, SLE 236 may take the statement level granularity and allow multiple changes to a function, as long as the solutions are directed toward different source code regions.

SIE 238 is the component that implements the list of solutions with their respective parameters. For each solution in the list, SIE 238 consults a corresponding SIE module (not shown) within SIE 238 for the module's modification or change to the application, which is mainly a change to the source code. However, SIE 238 does not allow the SIE modules to directly apply the changes to the source code. Instead, each SIE module must return to SIE 238, in terms of an agreed upon granularity, such as, for example, a line level granularity, the specific steps for the changes that should be made to the source code. SIE 238 specifies for each agreed upon granularity the allowed actions. For example, line level granularity includes the basic commands: remove a line, add a line, and replace a line. SIE 238 checks each SIE module one by one and then applies the changes one by one. More importantly, SIE 238 book-keeps or records each change already made by earlier executed modules so that the change made by the currently executed module is to the right source code location.

In general, extending performance bottleneck solutions involves: adding solution definitions to SDE DB 230; adding SPEMOD 234 definitions to the module table in SDE DB 230; adding SPEMODs 234 responsible for finding the specific parameters of the added solutions; adding legality check modules to the database in SLE 236; and adding implementation modules to the database in SIE 238.

With reference now to FIG. 3, an exemplary illustration of data contained within a solution determination engine (SDE) database is depicted in accordance with an illustrative embodiment. SDE database 300 may, for example, be SDE DB 230 in FIG. 2. SDE database 300 includes solution table 302 and module table 304.

Solution table 302 includes bottleneck name 306, solution list 308, and criteria 310. Bottleneck name 306 lists the names of identified performance bottlenecks. Solution list 308 lists possible candidate solutions for a corresponding performance bottleneck. Wildcard solutions, which are generic solutions that match any performance bottleneck within a particular set of performance bottlenecks, may also be used. Criteria 310 define solution priority criteria in case of conflict between solutions for an identified performance bottleneck. For example, when assigning priorities to performance bottleneck solutions that are applicable to the same source code region and are in conflict with each other, the solution with the best expected performance improvement is assigned the highest priority and is selected first. The solution priority criteria may be extended to fairly complex scripts or programs, which may provide for increased flexibility and accuracy.

As an example, an identified performance bottleneck in this illustration is "bad data cache behavior for a loop." Solution list 308 recommends three possible candidate solutions for this identified performance bottleneck, which are a "loop unroll and jam" solution, a "loop blocking" solution, and a "matrix transpose" solution. Solution priority criteria 310 for this identified performance bottleneck is "select the solution with the best cache performance improvement" when proposed candidate solutions are in conflict.

As another example, an identified performance bottleneck in this illustration is "excessive time on MPI calls." Solution list 308 recommends two possible candidate solutions for this identified performance bottleneck, which are an "improve load balancing" solution and a "communication and computation overlap" solution. Solution priority criteria 310 for this identified performance bottleneck is "select the solution with minimum source code impact" when proposed candidate solutions are in conflict.

Further in this illustrative example, for all identified performance bottlenecks included in solution table 302, the bottleneck solution determination system, such as bottleneck solution determination system 100 in FIG. 1, queries a compiler, such as compiler 112 in FIG. 1, for reports, which may contain helpful suggestions or hints for performance optimization of target applications. These reports may, for example, be in an extensible markup language (XML) format, but may also be in any other suitable format usable by processes of illustrative embodiments. The bottleneck solution determination system analyzes results from the compiler, which are stored in the XML report. Using this XML report, the bottleneck solution determination system may retrieve metrics and transformations for specific code regions that contain performance bottlenecks within a target application. For each performance bottleneck detected, the bottleneck solution determination system provides solutions that are likely to remove the performance bottlenecks and improve performance of the target application.

Module table 304 includes solution name 312, SPE module location 314, and module execution mode 316. Solution name 312 lists the names of performance bottleneck solutions. SPE module location 314 specifies the location of the solution parameter estimation module used to estimate the specific parameters for a corresponding performance bottleneck solution. These SPE modules compute or estimate the specific parameters used in solution implementation for a specific target application. The parameters include those that are necessary to implement the solution, the range of code (i.e., code region) that is impacted by the solution, and the performance impact on the target application by the solution.

Module execution mode 316 defines the mode in which a corresponding solution parameter estimation module will execute. Module execution mode for an SPE module is either inclusive or exclusive. Inclusive mode means that a corresponding SPE module is run in parallel or concurrently with other SPE modules. Exclusive mode means that a corresponding SPE module must run exclusively or by itself.

In this illustrative example, the "unroll" solution is an example of a simple solution whose specific parameters are estimated by an unroll SPE module run in an inclusive mode. In addition, the "global transpose" solution is an example of a composite solution whose specific parameters are estimated by a transpose SPE module and a loop interchange module.

Figures 4, 5, 6:
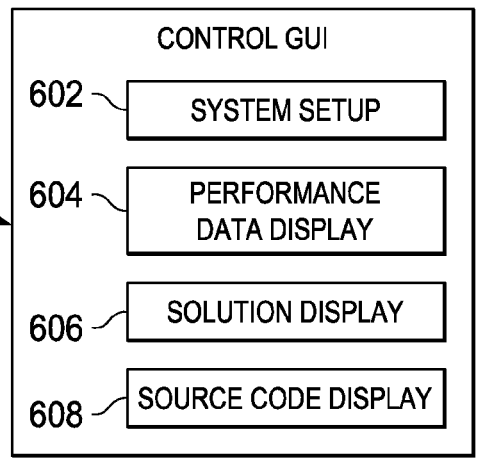
FIG. 4 is an exemplary illustration of data contained within a solution legality engine in accordance with an illustrative embodiment.
FIG. 5 is an exemplary illustration of data contained within a solution implementation engine in accordance with an illustrative embodiment.
FIG. 6 is an exemplary block diagram of a control graphical user interface in accordance with an illustrative embodiment.

With reference now to FIG. 4, an exemplary illustration of data contained within a solution legality engine is depicted in accordance with an illustrative embodiment. Solution legality engine (SLE) 400 may, for example, be SLE 236 in FIG. 2. SLE 400 includes SLE table 402. SLE table 402 includes solution name 404, SLE module name 406, and SLE module location 408.

Solution name 404 lists the names of performance bottleneck solutions for identified bottlenecks. SLE module name 406 lists the name of the SLE module used to perform legality and conflict checks between proposed candidate solutions for a corresponding performance bottleneck. SLE module location 408 specifies the location of the corresponding SLE module.

With reference now to FIG. 5, an exemplary illustration of data contained within a solution implementation engine is depicted in accordance with an illustrative embodiment. Solution implementation engine (SIE) 500 may, for example, be SIE 238 in FIG. 2. SIE 500 includes SIE table 502. SIE table 502 includes solution name 504, SIE module name 506, and SIE module location 508.

Solution name 504 lists the names of performance bottleneck solutions for identified bottlenecks. SIE module name 506 lists the name of the SIE module used to implement a corresponding solution for a performance bottleneck. SIE module location 508 specifies the location of the corresponding SIE module.

With reference now to FIG. 6, an exemplary block diagram of a control graphical user interface is depicted in accordance with an illustrative embodiment. Control GUI 600 may, for example, be control GUI 212 in FIG. 2. Control GUI 600 includes system setup 602, performance data display 604, solution display 606, and source code display 608. However, it should be noted that control GUI 600 is only intended as an example and, therefore, may include more or fewer components as needed by processes of illustrative embodiments.

System setup 602 allows a user, such as user 210 in FIG. 2, to configure the information necessary to operate the BDE framework, such as, for example, machine name, application name, application location, and environment variables. Performance data display 604 presents execution performance data for a target application, such as, for example, function location within the source code, time spent in a function, and hotspot evaluation results. Solution display 606 presents proposed candidate solutions to identified performance bottlenecks in a target application to a user for selection. Source code display 608 shows the source code for the target application for a given function location. Source code display 608 may work in conjunction with performance data display 604.

The functionality of control GUI 600 may, for example, include: accepting an input binary executable for a target application; making an initial request to a BDE, such as BDE 210 in FIG. 2, to perform target application profiling; receiving the profiling data and a list of source files; displaying the profiling data and source file list to the user; accepting user selections of specific hotspots or code regions for evaluation; accepting user selections of specific bottleneck dimensions; invoking the BDE; displaying returned bottleneck descriptions to the user; passing bottleneck definitions to an SDE, such as SDE 228 in FIG. 2, accepting a list of solutions from the SDE; querying a user for input on selecting which solutions to implement; passing the selected solutions to an SIE, such as SIE 238 in FIG. 2, and receiving results from the SIE.

Figure 7:
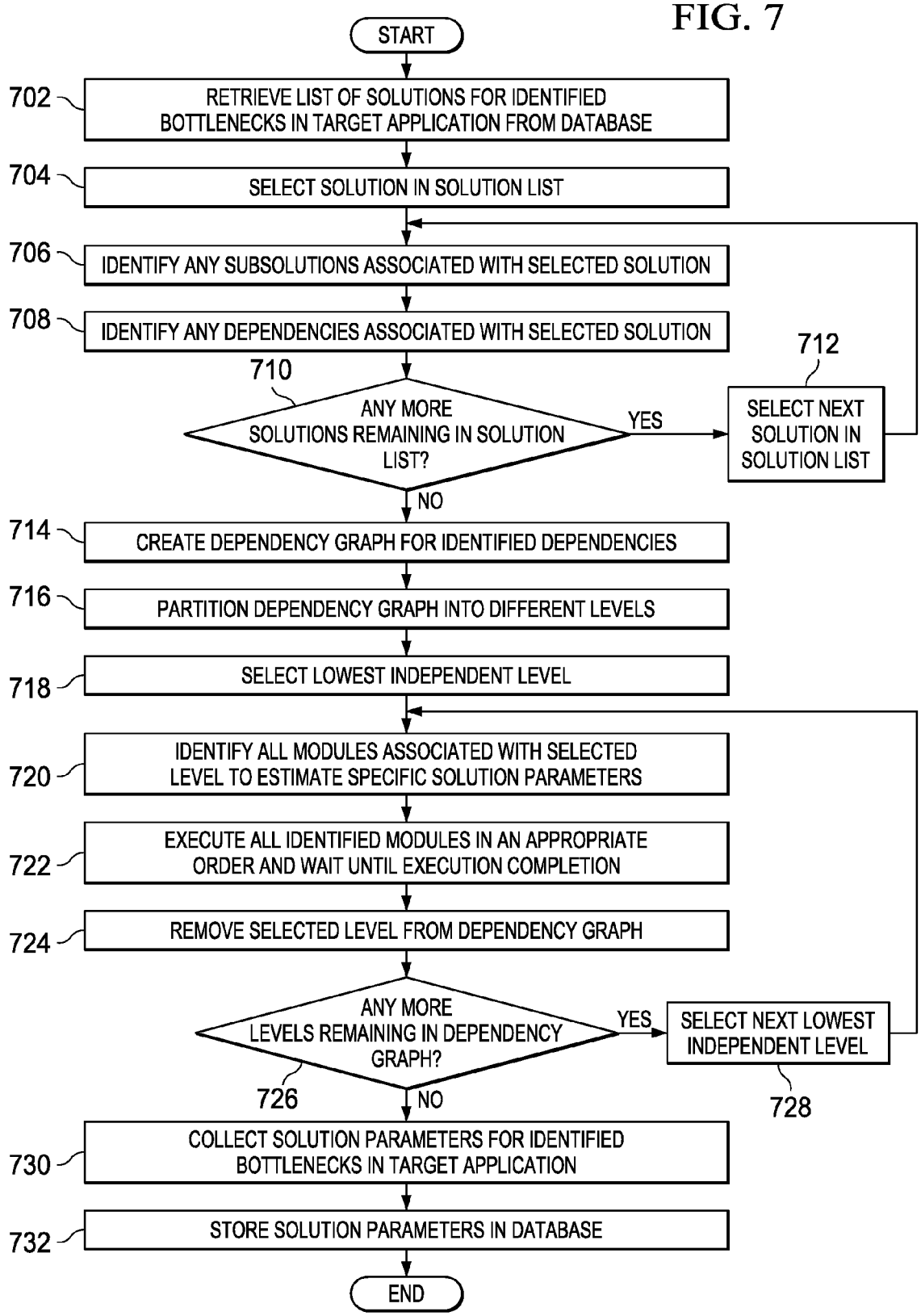
FIG. 7 is a flowchart illustrating an exemplary process for collecting solution parameters for identified bottlenecks in a target application in accordance with an illustrative embodiment.

With reference now to FIG. 7, a flowchart illustrating an exemplary process for collecting solution parameters for identified bottlenecks in a target application is shown in accordance with an illustrative embodiment. The process shown in FIG. 7 may be implemented in a solution parameter estimation scheduler, such as SPESCHED 232 in FIG. 2.

The solution parameter estimation scheduler invokes corresponding solution parameter estimation modules to compute or estimate solution parameters in an appropriate order. The ordering of parameter estimation modules is necessary because individual solutions may be composed to form composite solutions. For example, if solution 1, which may be a global matrix transpose solution, is composed from solution 2 and solution 3, which may be a matrix transpose solution and a loop interchange solution, respectively, then solution 2 and solution 3 must be computed or estimated prior to computing solution 1. Parameter estimation may involve actual execution of the target application or static analysis of source code in the target application. As a result, some parameters may be estimated concurrently or in parallel with other parameters, while other parameters must be estimated in an exclusive mode or by themselves.

The process begins when the solution parameter estimation scheduler retrieves a list of proposed candidate solutions for identified bottlenecks in specific source code regions within a target application from a solution table in an SDE database, such as solution table 302 in SDE database 300 in FIG. 3 (step 702). It should be noted that simple bottleneck solutions may be combined to construct composite bottleneck solutions. Each simple solution has a corresponding logical solution parameter estimation module, which is responsible for estimating the specific parameters associated with it. In the case of composite solutions, the solution parameter estimation scheduler is responsible for interpreting the composition rules.

After retrieving the proposed candidate solution list in step 702, the solution parameter estimation scheduler selects a solution in the solution list (step 704) and identifies any sub-solutions (step 706) and any dependencies (step 708) associated with the selected solution. Afterward, the solution parameter estimation scheduler makes a determination as to whether more solutions remain in the solution list (step 710). If more solutions remain in the solution list, yes output of step 710, then the solution parameter estimation scheduler selects the next solution in the solution list (step 712). Thereafter, the process returns to step 706. If no more solutions remain in the solution list, no output of step 710, then the solution parameter estimation scheduler creates a dependency graph for the identified dependencies for the selected solution (step 714). The dependency graph uses a solution as a node and any dependency with another solution as an edge. An edge shoots out from the solution toward another solution it is dependent upon.

Subsequent to creating the dependency graph in step 714, the solution parameter estimation scheduler partitions the dependency graph into different levels (step 716). The solution parameter estimation scheduler partitions the dependency graph into different levels such that within each level no dependency among solutions exists. One way to do this is for the solution parameter estimation scheduler to sort the nodes by their out-degrees and label all nodes with out-degree zero, which is the lowest level, level zero. Initially, only simple solutions/modules exist on level zero. Then, the solution parameter estimation scheduler removes all vertices in level zero and edges that incident to these vertices. Then, the solution parameter estimation scheduler places all vertices with out-degree zero into level one. The solution parameter estimation scheduler iterates until no nodes are left in the graph. For a solution/module that must be run in an exclusive mode, the solution parameter estimation scheduler places that solution/module in a level by itself.

After partitioning the dependency graph into different levels in step 716, the solution parameter estimation scheduler selects the lowest independent level in the dependency graph (step 718). Then, the solution parameter estimation scheduler identifies all modules associated with the selected level to estimate specific solution parameters (step 720). Subsequent to identifying all modules associated with the selected level in step 720, the solution parameter estimation scheduler executes all the identified modules in an appropriate order and waits until all the modules complete execution of computing or estimating their respective specific solution parameters (step 722). Then, the solution parameter estimation scheduler removes the selected level from the dependency graph (step 724).

Afterward, the solution parameter estimation scheduler makes a determination as to whether more levels remain in the dependency graph (step 726). If more levels remain in the dependency graph, yes output of step 726, then the solution parameter estimation scheduler selects the next lowest level in the dependency graph (step 728). Thereafter, the process returns to step 720. If no more levels remain in the dependency graph, no output of step 726, then the solution parameter estimation scheduler collects the specific solution parameters, which were estimated by the solution parameter estimation modules, for the identified bottlenecks in the target application (step 730). Subsequently, the solution parameter estimation scheduler stores the collected solution parameters in the SDE database (step 732). Thereafter, the process terminates.

Figure 8:
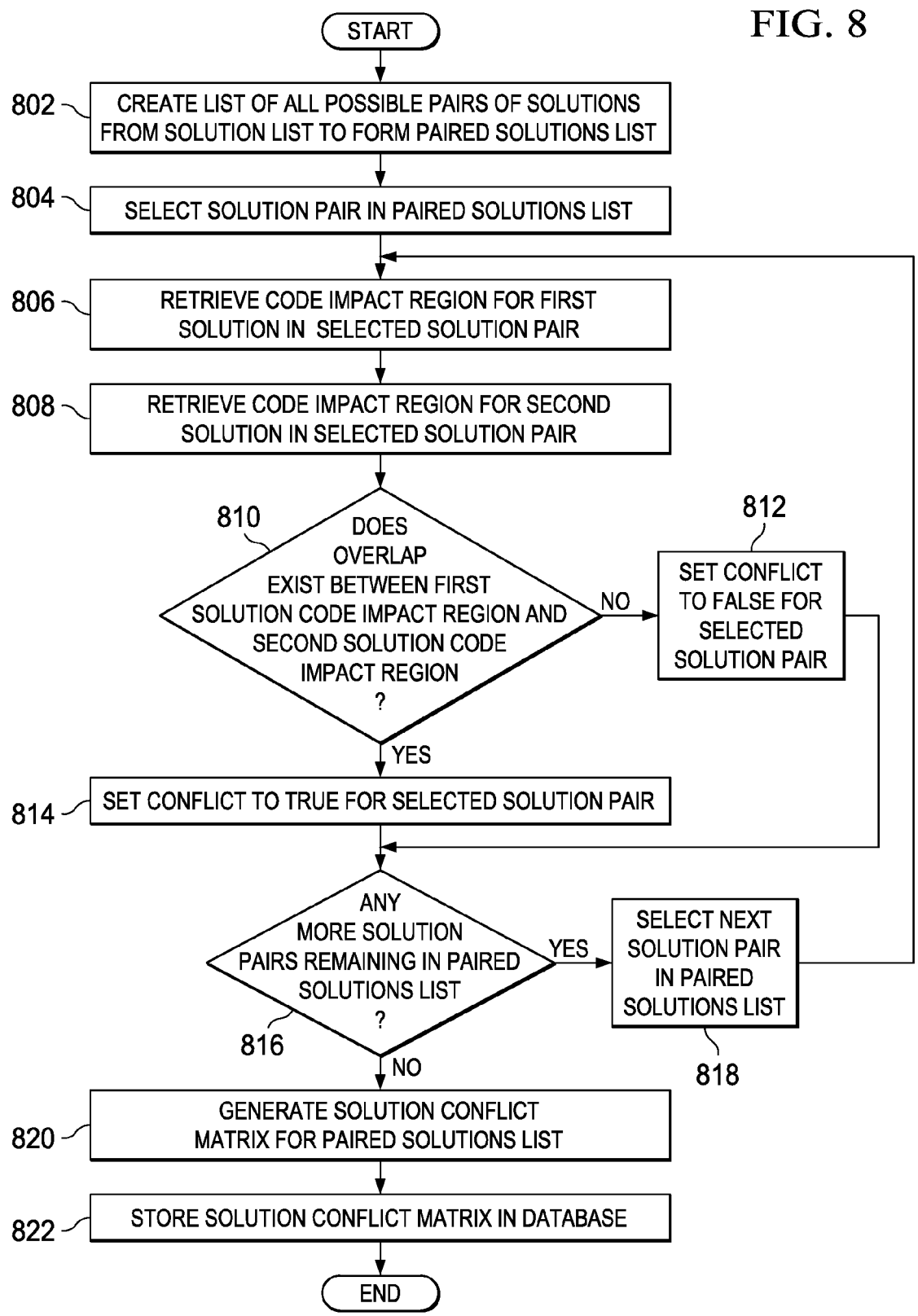
FIG. 8 is a flowchart illustrating an exemplary process for generating a solution conflict matrix in accordance with an illustrative embodiment.

With reference now to FIG. 8, a flowchart illustrating an exemplary process for generating a solution conflict matrix is shown in accordance with an illustrative embodiment. The process shown in FIG. 8 may be implemented in a solution legality engine, such as SLE 236 in FIG. 2. The solution legality engine checks for conflicts between any two solutions in a solution list for identified performance bottlenecks in a target application.

The process begins when the solution legality engine creates a list of all possible pairs of solutions from a solution list to form a paired solutions list (step 802). After creating the paired solutions list in step 802, the solution legality engine selects a solution pair in the paired solutions list (step 804). Then, the solution legality engine retrieves a code impact region for the first solution in the selected solution pair (step 806) and a code impact region for the second solution in the selected solution pair (step 808).

Subsequent to retrieving the code impact regions for the first and second solutions in the selected solution pair in steps 806 and 808, the solution legality engine makes a determination as to whether overlap exists between the first solution code impact region and the second solution code impact region (step 810). If overlap does not exist between the first solution code impact region and the second solution code impact region, no output of step 810, then the solution legality engine sets conflict to false for the selected solution pair (step 812). In other words, no code impact region overlap equals no solution conflict. Thereafter, the process proceeds to step 816. If overlap does exist between the first solution code impact region and the second solution code impact region, yes output of step 810, then the solution legality engine sets conflict to true for the selected solution pair (step 814). In other words, code impact region overlap equals bottleneck solution conflict.

Afterward, the solution legality engine makes a determination as to whether more solution pairs remain in the paired solutions list (step 816). If more solution pairs remain in the paired solutions list, yes output of step 816, then the solution legality engine selects the next solution pair in the paired solutions list (step 818). Thereafter, the process returns to step 806. If no more solution pairs remain in the paired solutions list, no output of step 816, then the solution legality engine generates a solution conflict matrix for the paired solutions list (step 820). A solution conflict matrix is a matrix that shows conflicts between solutions contained within a solutions list. Afterward, the solution legality engine stores the solution conflict matrix in a database within the solution legality engine (step 822). Thereafter, the process terminates.

Figure 9:
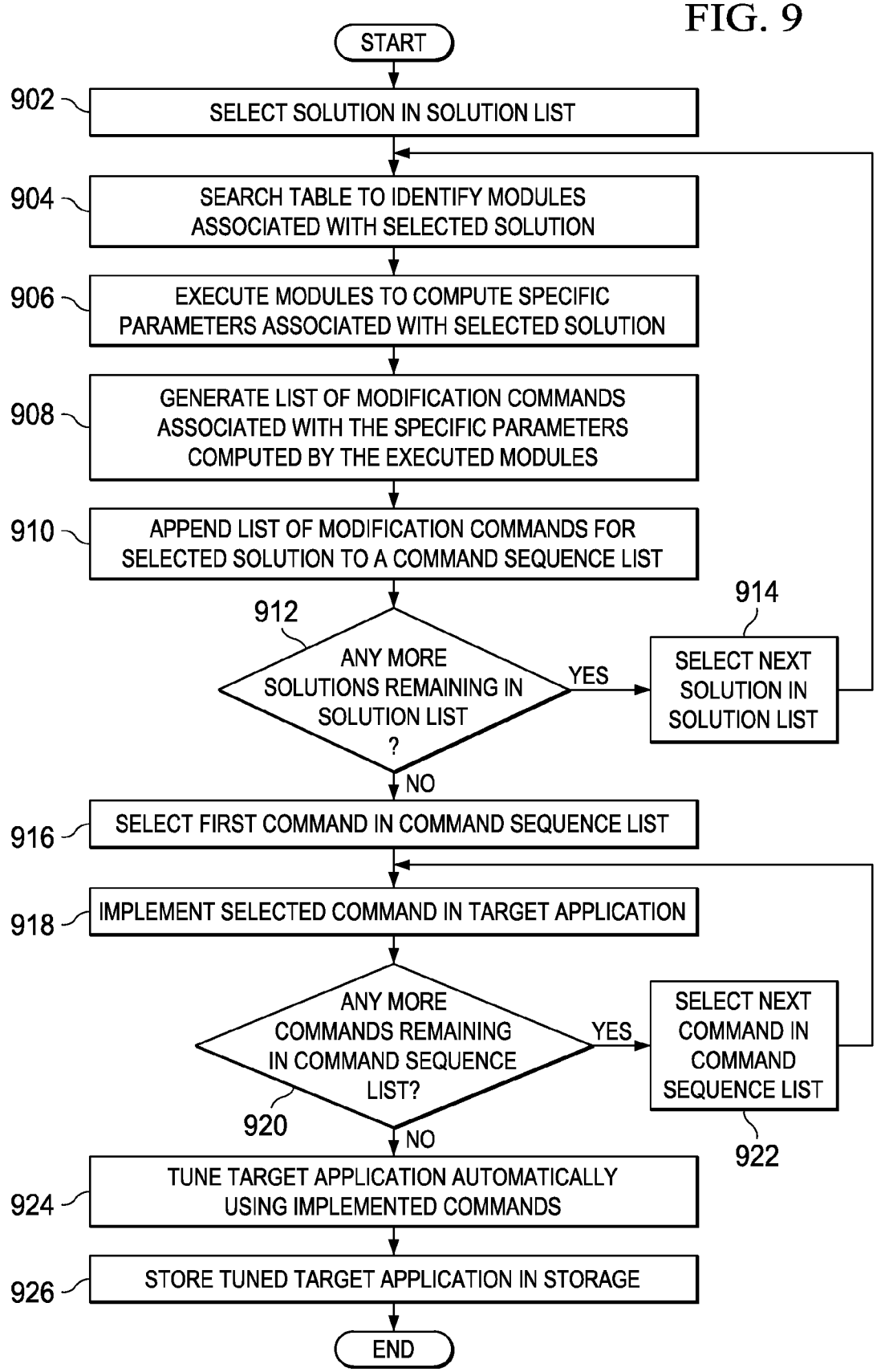
FIG. 9 is a flowchart illustrating an exemplary process for automatically tuning a target application in accordance with an illustrative embodiment.

With reference now to FIG. 9, a flowchart illustrating an exemplary process for automatically tuning a target application is shown in accordance with an illustrative embodiment. The process shown in FIG. 9 may be implemented in a solution implementation engine, such as SIE 238 in FIG. 2.

The process begins when the solution implementation engine selects a solution in a solution list (step 902). Then, the solution implementation engine searches a table, such as module table 302 in FIG. 3, to identify all solution implementation modules associated with the selected solution (step 904). Afterward, the solution implementation engine executes all the identified solution implementation modules to compute the specific parameters associated with the selected solution (step 906).

Then, the solution implementation engine generates a list of modification commands associated with the specific parameters computed by the executed solution implementation modules (step 908). Subsequently, the solution implementation engine appends the list of modification commands for the selected solution to a command sequence list (step 910). The solution implementation engine uses the command sequence list to implement each modification command one by one in the correct order in a target application.

After appending the list of modification commands for the selected solution to the command sequence list in step 910, then the solution implementation engine makes a determination as to whether more solutions remain in the solution list (step 912). If more solutions remain in the solution list, yes output of step 912, then the solution implementation engine selects the next solution in the solution list (step 914). Thereafter, the process returns to step 904. If no more solutions remain in the solution list, no output of step 912, then the solution implementation engine selects the first modification command in the command sequence list (step 916). Then, the solution implementation engine implements the selected modification command in the target application (step 918).

Subsequent to implementing the selected modification command in step 918, the solution implementation engine makes a determination as to whether more modification commands remain in the command sequence list (step 920). If more modification commands remain in the command sequence list, yes output of step 920, then the solution implementation engine selects the next modification command in the command sequence list (step 922). Thereafter, the process returns to step 918. If no more modification commands remain in the command sequence list, no output of step 920, then the solution implementation engine automatically tunes specific source code regions corresponding to identified performance bottlenecks within the target application using the implemented modification commands (step 924). Then, the solution implementation engine stores the tuned target application in a storage device, such as persistent storage 108 in FIG. 1 (step 926). Thereafter, the process terminates.

Thus, illustrative embodiments of the present invention provide a computer implemented method, system, and computer program product for an extensible and programmable framework for automatic performance analysis and tuning of target software applications. The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for automatically tuning a target application, the computer implemented method comprising:

generating, by the data processing system, a dependency graph of dependencies associated with a selected solution in a list of solutions corresponding to identified performance bottlenecks in the target application;

partitioning, by the data processing system, the dependency graph of the dependencies associated with the selected solution into different levels;

executing, by the data processing system, modules within each of the different levels of the dependency graph in an appropriate order one successive level after another and waiting for the modules to complete computing of specific parameters associated with the selected solution;

generating, by the data processing system, a list of modification commands associated with the specific parameters computed by the modules;

appending, by the data processing system, the list of modification commands associated with the specific parameters to a command sequence list;

implementing, by the data processing system, the list of modification commands in the target application;

tuning automatically, by the data processing system, specific source code regions corresponding to the identified performance bottlenecks in the target application using the implemented list of modification commands; and storing, by the data processing system, the tuned target application in a storage device.

2. The computer implemented method of claim 1, further comprising:
    selecting, by the data processing system, a solution in the list of solutions; and
    identifying, by the data processing system, dependencies associated with the selected solution.

3. The computer implemented method of claim 1, further comprising:
    identifying, by the data processing system, the modules associated with each of the different levels to compute solution parameters;
    collecting, by the data processing system, the solution parameters computed by the identified modules; and
    storing, by the data processing system, the collected solution parameters in a database in the storage device.

4. The computer implemented method of claim 1, further comprising:
    generating, by the data processing system, a list of all possible pairs of solutions within the list of solutions;
    selecting, by the data processing system, a solution pair in the list of all possible pairs of solutions;
    retrieving, by the data processing system, a first code impact region within the target application associated with a first solution in the selected solution pair;
    retrieving, by the data processing system, a second code impact region within the target application associated with a second solution in the selected solution pair;
    determining, by the data processing system, whether code overlap exists between the first code impact region within the target application associated with the first solution in the selected solution pair and the second code impact region within the target application associated with the second solution in the selected solution pair;
    responsive to determining that code overlap does exist between the first code impact region within the target application associated with the first solution in the selected solution pair and the second code impact region within the target application associated with the second solution in the selected solution pair, setting, by the data processing system, conflict to true for the selected solution pair; and
    responsive to determining that code overlap does not exist between the first code impact region within the target application associated with the first solution in the selected solution pair and the second code impact region within the target application associated with the second solution in the selected solution pair, setting, by the data processing system, conflict to false for the selected solution pair.

5. The computer implemented method of claim 4, further comprising:
    generating, by the data processing system, a solution conflict matrix that shows conflicts between solutions contained in the list of solutions; and
    storing, by the data processing system, the generated solution conflict matrix in a database in the storage device.

6. The computer implemented method of claim 3, wherein a solution parameter has a corresponding logical module that is responsible for computing the solution parameter.

7. The computer implemented method of claim 1, wherein each module of the modules computes a different specific parameter associated with a corresponding solution in the list of solutions.

8. The computer implemented method of claim 1, wherein a module is added to the modules to compute specific parameters associated with a newly added solution providing extensibility to a bottleneck solution determination system.

9. The computer implemented method of claim 1, wherein the list of solutions corresponding to the identified performance bottlenecks in the target application includes at least one of modifications to source code regions affected by the identified performance bottlenecks, guidance to a compiler, modifications to an environment of the target application, and reconfigurations to hardware running the target application.

10. The computer implemented method of claim 1, wherein a legality check is performed on solutions contained in the list of solutions, and wherein the legality check determines whether applying a solution to the target application violates any predefined rules.

11. The computer implemented method of claim 4, wherein solution priority criteria are assigned to conflicting solutions in the selected solution pair, and wherein a solution in the selected solution pair with a highest calculated performance improvement is assigned a highest priority, and wherein the solution in the selected solution pair with the highest priority is selected first.

12. A data processing system for automatically tuning a target application, the data processing system comprising:
    a bus system;
    a storage device connected to the bus system, wherein the storage device stores a set of instructions; and
    a processing unit connected to the bus system, wherein the processing unit executes the set of instructions to generate a dependency graph of dependencies associated with a selected solution in a list of solutions corresponding to identified performance bottlenecks in the target application;
    the processing unit executes the set of instructions to partition the dependency graph of the dependencies associated with the selected solution into different levels;
    the processing unit executes the set of instructions to execute modules within each of the different levels of the dependency graph in an appropriate order one successive level after another and waiting for the modules to complete computing of specific parameters associated with the selected solution;
    the processing unit executes the set of instructions to generate a list of modification commands associated with the specific parameters computed by the modules;
    the processing unit executes the set of instructions to append the list of modification commands associated with the specific parameters to a command sequence list;
    the processing unit executes the set of instructions to implement the list of modification commands in the target application;
    the processing unit executes the set of instructions to automatically tune specific source code regions corresponding to the identified performance bottlenecks in the target application using the implemented list of modification commands; and
    the processing unit executes the set of instructions to store the tuned target application in the storage device.

13. The data processing system of claim 12, wherein the processing unit executes a further set of instructions to select a solution in the list of solutions;
    the processing unit executes the further set of instructions to identify dependencies associated with the selected solution;
    the processing unit executes the further set of instructions to identify the modules associated with each of the different levels to compute solution parameters;
    the processing unit executes the further set of instructions to collect the solution parameters computed by the identified modules; and the processing unit executes the further set of instructions to store the collected solution parameters in a database in the storage device.

14. The data processing system of claim 12, wherein the processing unit executes a further set of instructions to generate a list of all possible pairs of solutions within the list of solutions;
the processing unit executes the further set of instructions to select a solution pair in the list of all possible pairs of solutions;
the processing unit executes the further set of instructions to retrieve a first code impact region within the target application associated with a first solution in the selected solution pair;
the processing unit executes the further set of instructions to retrieve a second code impact region within the target application associated with a second solution in the selected solution pair;
the processing unit executes the further set of instructions to determine whether code overlap exists between the first code impact region within the target application associated with the first solution in the selected solution pair and the second code impact region within the target application associated with the second solution in the selected solution pair;
the processing unit executes the further set of instructions to set conflict to true for the selected solution pair in response to determining that code overlap does exist between the first code impact region within the target application associated with the first solution in the selected solution pair and the second code impact region within the target application associated with the second solution in the selected solution pair;
the processing unit executes the further set of instructions to set conflict to false for the selected solution pair in response to determining that code overlap does not exist between the first code impact region within the target application associated with the first solution in the selected solution pair and the second code impact region within the target application associated with the second solution in the selected solution pair;
the processing unit executes the further set of instructions to generate a solution conflict matrix that shows conflicts between solutions contained in the list of solutions; and
the processing unit executes the further set of instructions to store the generated solution conflict matrix in a database in the storage device.

15. A computer program product stored in a computer readable storage device having computer usable program code embodied therein that is executable by a computer for automatically tuning a target application, the computer program product comprising:
computer usable program code for generating a dependency graph of dependencies associated with a selected solution in a list of solutions corresponding to identified performance bottlenecks in the target application;
computer usable program code for partitioning the dependency graph of the dependencies associated with the selected solution into different levels;
computer usable program code for executing modules within each of the different levels of the dependency graph in an appropriate order one successive level after another and waiting for the modules to complete computing of specific parameters associated with the selected solution;
computer usable program code generating a list of modification commands associated with the specific parameters computed by the modules;
computer usable program code for appending the list of modification commands associated with the specific parameters to a command sequence list;
computer usable program code for implementing the list of modification commands in the target application;
computer usable program code for automatically tuning specific source code regions corresponding to the identified performance bottlenecks in the target application using the implemented list of modification commands; and
computer usable program code for storing the tuned target application in a storage device.

16. The computer program product of claim 15, further comprising:
computer usable program code for selecting a solution in the list of solutions; and
computer usable program code for identifying dependencies associated with the selected solution.

17. The computer program product of claim 15, further comprising:
computer usable program code for identifying the modules associated with each of the different levels to compute solution parameters;
computer usable program code for collecting the solution parameters computed by the identified modules; and
computer usable program code for storing the collected solution parameters in a database in the storage device.

18. The computer program product of claim 15, further comprising:
computer usable program code for generating a list of all possible pairs of solutions within the list of solutions;
computer usable program code for selecting a solution pair in the list of all possible pairs of solutions;
computer usable program code for retrieving a first code impact region within the target application associated with a first solution in the selected solution pair;
computer usable program code for retrieving a second code impact region within the target application associated with a second solution in the selected solution pair;
computer usable program code for determining whether code overlap exists between the first code impact region within the target application associated with the first solution in the selected solution pair and the second code impact region within the target application associated with the second in the selected solution pair;
computer usable program code for setting conflict to true for the selected solution pair in responsive to determining that code overlap does exist between the first code impact region within the target application associated with the first solution in the selected solution pair and the second code impact region within the target application associated with the second solution in the selected solution pair; and
computer usable program code for setting conflict to false for the selected solution pair in response to determining that code overlap does not exist between the first code impact region within the target application associated with the first solution in the selected solution pair and the second code impact region within the target application associated with the second solution in the selected solution pair.

19. The computer program product of claim 18, further comprising:
   computer usable program code for generating a solution conflict matrix that shows conflicts between solutions contained in the list of solutions; and
   computer usable program code for storing the generated solution conflict matrix in a database in the storage device.

20. The computer program product of claim 15, wherein each module of the modules computes a different specific parameter associated with a corresponding solution in the list of solutions.

* * * * *